Oct. 30, 1962   E. H. L. JOHANNES   3,061,440
PROCESS FOR MAKING SPAGHETTI
Filed March 8, 1961   2 Sheets—Sheet 1
FIG. I.
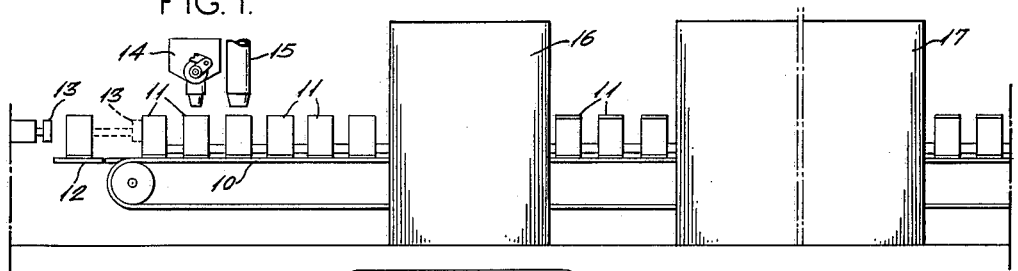
FIG. 2.
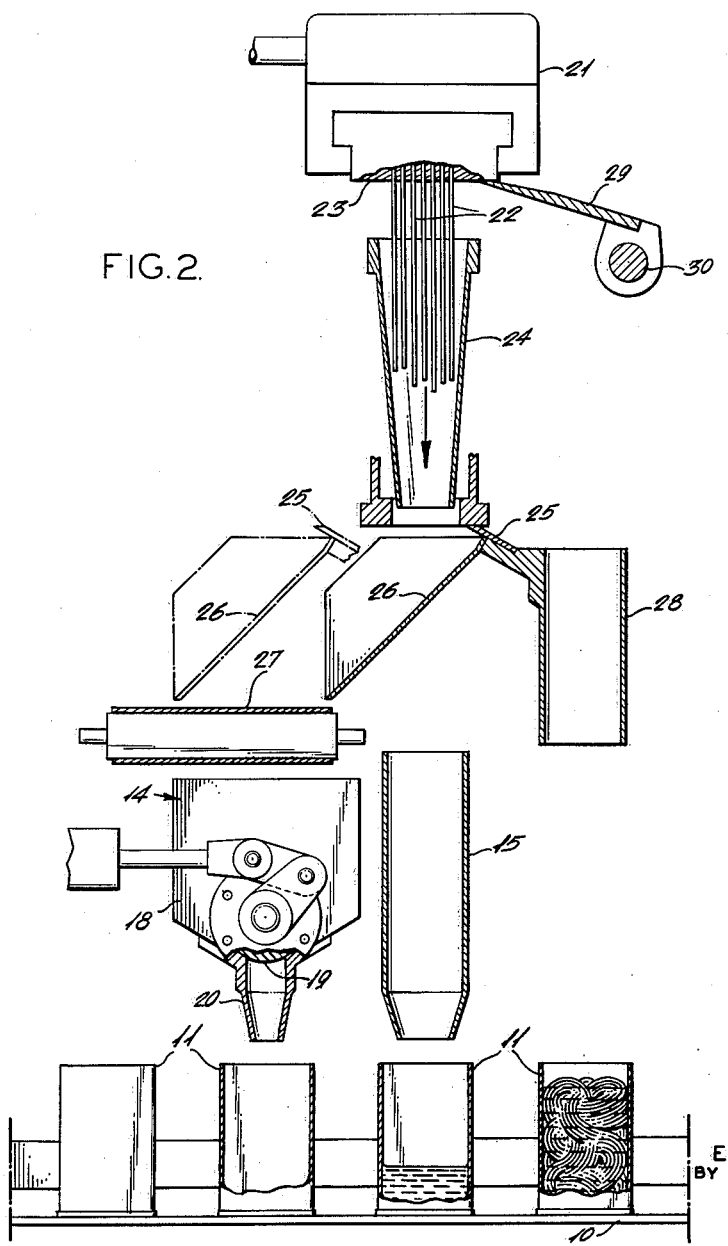
INVENTOR
ERICH H.L. JOHANNES
BY Howson & Howson
ATTYS.

Oct. 30, 1962  E. H. L. JOHANNES  3,061,440
PROCESS FOR MAKING SPAGHETTI
Filed March 8, 1961  2 Sheets-Sheet 2

INVENTOR:
ERICH H. L. JOHANNES
BY Howson & Howson
ATTYS.

United States Patent Office 3,061,440
Patented Oct. 30, 1962

3,061,440
PROCESS FOR MAKING SPAGHETTI
Erich H. L. Johannes, Haddonfield, N.J., assignor to Campbell Soup Company, Camden, N.J., a corporation of New Jersey
Filed Mar. 8, 1961, Ser. No. 94,209
4 Claims. (Cl. 99—85)

The present invention relates to new and useful improvements in processes for making spaghetti and particularly processes for making canned cooked spaghetti wherein each can contains a predetermined number of strands of spaghetti of predetermined length together with the desired sauce.

This application is a continuation-in-part of my copending application Serial No. 659,638, now Patent No. 2,977,902, filed May 16, 1957.

In the manufacture of canned cooked spaghetti it is important that each can contain a predetermined quantity of spaghetti and a predetermined quantity of sauce. It is also important that these quantities of spaghetti and sauce be uniform from can to can over an extended period of time so that the ultimate user of the spaghetti is assured of obtaining a uniform quality product upon each purchase. If it is the user's experience that at one time a can of spaghetti contains too much sauce and not enough spaghetti and another time a can contains too much spaghetti and not enough sauce, that user would soon switch to a different brand.

Prior to the present invention in the manufacture of canned cooked spaghetti the spaghetti was first extruded into strands and cut into sections of predetermined lengths. These cut sections of spaghetti were then blanched and cooked and thereafter put into cans containing sauce. Each can was weighed individually and if the can was under weight, a worker added spaghetti or sauce to the can, depending on his own judgment as to whether the can should have spaghetti or sauce added to it. This left the ratio of spaghetti to sauce in a can to the worker's judgment, the worker usually being an unskilled laborer, with the results that the final product was not of uniform quality. Furthermore, this handling of the spaghetti between the cooking, blanching and canning steps resulted in providing a jumbled mass of spaghetti of uneven length in each can which did not present a neat appearance when deposited in a pan for cooking by a housewife.

With the foregoing in mind a primary object of the present invention is to provide a novel method for making cooked canned spaghetti, providing a uniform finished product of high quality.

A further object of the present invention is to provide a novel continuous method of making cooked canned spaghetti in which a predetermined number of sections of spaghetti of predetermined length are deposited in a can thereby providing in the can a predetermined weight of spaghetti.

Still a further object of the present invention is to provide a novel continuous method for forming cooked canned spaghetti in which the spaghetti is deposited directly into the can from the extruder thereby eliminating many handling steps of the spaghetti and providing spaghetti to the ultimate user at a lower cost.

These and other objects of the present invention and the various features and details of the operation thereof are hereinafter more fully set forth and described with reference to the accompanying drawings, in which:

FIG. 1 is a schematic side elevational view of apparatus for carrying out the method of the present invention;

FIG. 2 is a schematic sectional view of apparatus for forming and cutting the spaghetti strands and depositing the same in a can.

Figure 3:
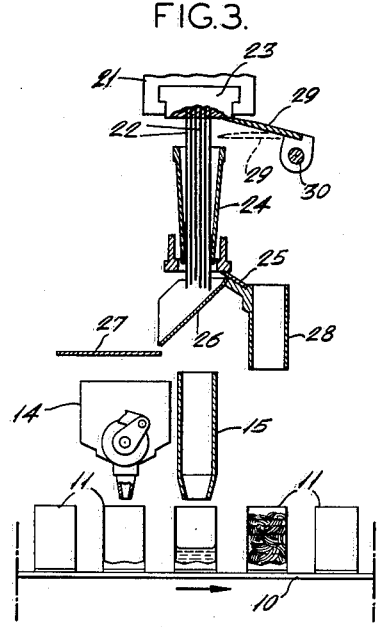
FIGS. 3 to 6, inclusive, are schematic views illustrating progressive positions of the trim and cutoff knives and associated mechanism during one cycle of operation.

Referring more specifically to the drawings and particularly FIG. 1 thereof, apparatus for carrying out the process of the present invention may comprise a conveyor, such as endless conveyor 10 which operates to advance cans 11 intermittently. The cans 11 are fed to the conveyor 10 from a feed table 12 which supports the cans in front of the feed end of the conveyor. The cans are transferred to the conveyor, for example, by means of a plunger 13. Thereafter, the cans are advanced past a sauce applying unit 14 and a discharge chute 15. At the sauce applying unit 14 the cans receive a predetermined quantity of spaghetti sauce or the like while the cans pass the discharge chute 15 a predetermined number of sections of spaghetti of predetermined length are deposited into the cans. After the cans have received the spaghetti and sauce, they pass through a can sealing machine, designated generally as 16, which seals the cans and thereafter the cans pass through a conventional oven 17 wherein the spaghetti is cooked. While the cans are illustrated in the drawings as being carried through the oven 17 by the conveyor 10, if desired, the cans may be turned on their side and caused to roll through the oven 17 to maintain the spaghetti within the can in a constant state of motion while the spaghetti is being cooked.

The sauce applying unit 14 may comprise a hopper or trough 18 for containing the spaghetti sauce or the like and a rotary valve 19 which is operated in timed response to advancement of the cans 11, by the conveyor 10 and is opened at predetermined intervals to discharge a predetermined quantity of sauce through a nozzle 20 into the cans 11.

In accordance with the present invention the spaghetti is extruded in continuous lengths with the lengths of spaghetti being trimmed and cut into sections of predetermined length with a predetermined number of said sections of predetermined length being deposited in each can 11. One form of apparatus for accomplishing this is illustrated in FIG. 2 of the drawings and comprises a conventional extruder 21 adapted to extrude strands of spaghetti 22 through an extrusion plate 23. Preferably the extrusion plate 23 is formed with a series of groups of openings with a predetermined number of openings in each group. The number of openings in each group is equal to the number of sections of spaghetti desired to be deposited in each can. With the construction a predetermined number of continuous strands of spaghetti 22 are extruded through the extrusion die 23 and this group of strands is then cut into sections of the desired length and caused to be deposited directly into a can or container.

Figure 4:
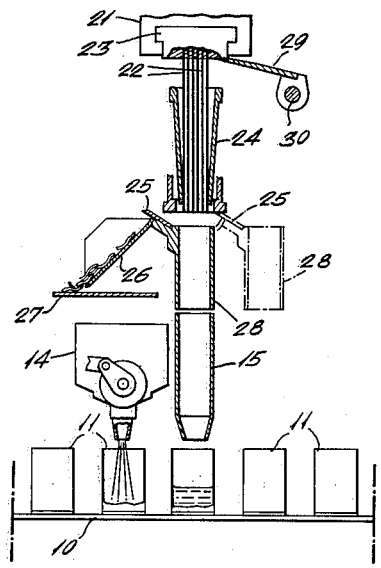

The extruded strands of spaghetti pass downwardly from the die plate 23 through the upper end of a guide chute or funnel 24 to a point slightly beneath the lower end of the funnel, as indicated in FIG. 3 of the drawings. Thereafter the lower ends of the strands are trimmed, for example, by means of a trim knife 25 which is caused to move transversely of the lower end of the funnel 24. This trims all of the strands to an even length, as illustrated in FIG. 4. In this connection, it is pointed out that when the strands are extruded through the die plate 23 they are not all of the same length thus making this trimming operation necessary.

The trimmings thus cut off slide down a chute 26 movable with the trim knife and onto a continuously operating return conveyor 27 which returns the trimmings back to the spaghetti dough supply. When the trim knife reaches its fully extended position, trimming the lower ends of the strands, a guide tube 28 also movable with the trim knife 25 and chute 26 is positioned in alignment with the lower end of the funnel 24 providing a direct passage from the extrusion die 23 to the cans or containers 11.

Figure 5:
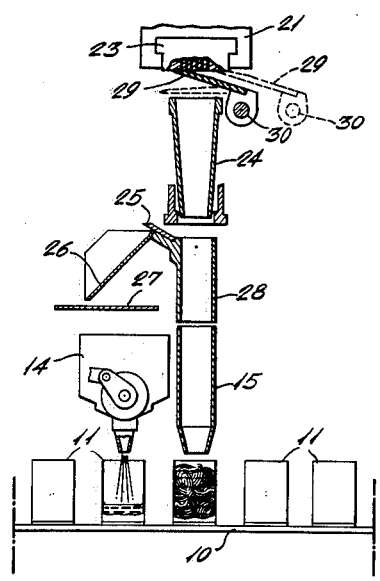
Figure 6:
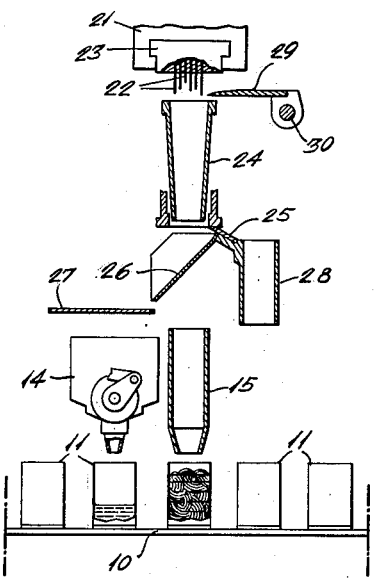

As illustrated in FIG. 5 when the trim knife is moved to its left-hand position, with reference to FIG. 5, and the guide tube 28 is brought into alignment with the lower end of the funnel 24, and also in alignment with the guide tube 15, a cutoff knife 29 is immediately moved across the bottom face of the extrusion die 23 to cut off the strands of spaghetti. Upon actuation of the cutoff knife the strands of spaghetti are cut into sections of predetermined uniform length and dropped through the funnel 24, guide tube 28 and guide tube 15 directly into the waiting can or container 11. The cutoff knife 28 is actuated back and forth across the lower face of the extrusion die 23 in timed relation to actuation of the trim knife and is carried by a rotatable shaft 30. After the cutoff knife reaches its fully extended position, as shown in full lines in FIG. 5, the shaft 30 is rocked in a counterclockwise direction relative to FIG. 5, thereby lowering the trim knife away from the lower surface of the die. The cutoff knife is then returned, while out of engagement with the die, to the position as shown in FIG. 6 and the shaft 30 is then rocked in the clockwise direction relative to FIG. 6 to return the knife to its position adjacent the lower face of the extrusion die 23. Upon return of the cutoff knife 29 to its right-hand position, the trim knife 25 and associated chute 26 and guide tube 28 are also returned to their right-hand position relative to FIG. 2 and the apparatus is in position for another cycle of operation.

FIGS. 3 to 6, inclusive, illustrate diagrammatically the operation of the spaghetti forming section of the present invention. As illustrated in FIG. 3, the continuous strands of spaghetti have been extruded through the extrusion die 23 with the lower ends extending beneath the lower end of the funnel 24. The trim knife is then actuated to the left with respect to FIG. 3 to the position as illustrated in FIG. 4. During actuation of the trim knife the lower ends of the strands of spaghetti are cut off evenly and the trimmed segments of spaghetti are deposited on the return conveyor 27. Thereafter the cutoff knife is actuated to the left with respect to FIG. 4, to the position as illustrated in FIG. 5, cutting the strands of spaghetti into sections of predetermined length which drop downwardly into the can or container 11. The cutoff knife 29 is then lowered away from the lower surface of the extrusion die 23 and moved to the right, to the position as illustrated in FIG. 6 and the trim knife and chute are also moved to the right. The cutoff knife is then raised to a position in engagement with the lower surface of the extrusion die thereby completing one cycle of operation of the spaghetti section of this machine and preparing the section for a subsequent operation of cutting off and forming sections of spaghetti of predetermined uniform length. During the return of the cutoff knife and trim knife sauce is inserted into the can from the sauce unit 14 and the conveyor 10 is advanced one step thereby placing a subsequent can beneath the guide chute 15 preparatory to receiving a batch of spaghetti.

The completed cans of spaghetti are then sent to the can sealing machine 16 and cooker 17 as described above completing the process of forming a can of cooked spaghetti.

From the foregoing it will be observed that the present invention provides a novel process for filling cans with predetermined number of sections of spaghetti of predetermined length and also provides a novel process for forming canned cooked spaghetti.

While a particular embodiment of the present invention has been illustrated and described herein it is not intended to limit the invention to such a disclosure, and changes and modifications may be incorporated and embodied therein within the scope of the following claims.

I claim:

1. A process for forming spaghetti sections of predetermined length and depositing a predetermined number of said sections into a container comprising; continuously extruding dough into a predetermined number of separate strands, causing said extruded strands to pass vertically downwardly along a predetermined path, trimming the lower ends of all of said extruded strands at a predetermined location spaced from the upper ends of said strands to cause all of said strands to be substantially uniform in length, immediately following the trimming of the lower ends of said strands, cutting said strands at a point adjacent their upper ends to divide said continuous strands into divided sections of predetermined length, confining said divided sections to a predetermined path, permitting said divided sections to fall substantially freely from the point of cutoff along said predetermined path into a container, and collecting the trimmings from the lower ends of the strands separately from said sections.

2. A process in accordance with claim 1 wherein the lower ends of said extruded strands are trimmed while the extruded strands are passing vertically downwardly.

3. A process for forming cans of cooked spaghetti each containing a predetermined number of strands of predetermined length, comprising; continuously extruding dough into a plurality of groups each containing a predetermined number of separate strands, causing said plurality of groups of extruded strands to pass vertically downwardly along a predetermined path, trimming the lower ends of all of said extruded strands of all of said plurality of groups at a predetermined location spaced from the upper ends of said strands to cause all of said strands to be substantially uniform in length, immediately following trimming of the lower ends of said strands cutting said strands at a point adjacent their upper ends to divide said strands into a plurality of groups of divided sections each containing a predetermined number of sections of predetermined uniform length, confining each of said plurality of groups of divided sections to a separate predetermined path, permitting each of said plurality of groups of divided sections to fall substantially freely into a container at the lower end of each of said separate paths, sealing said containers, and thereafter, cooking said spaghetti in said sealed containers.

4. A process for forming cans of cooked spaghetti in accordance with claim 3 wherein the trimmings from the lower ends of said strands are collected separately from said sections.

References Cited in the file of this patent

UNITED STATES PATENTS

| | | |
|---|---|---|
| 2,205,834 | Him | June 25, 1940 |
| 2,366,366 | Souder | Jan. 2, 1945 |